United States Patent [19]

Earl et al.

[11] 4,188,913
[45] Feb. 19, 1980

[54] BIRD FEEDERS

[76] Inventors: Norman M. Earl, R.D. #1, Crystal Lake Rd., Stafford Springs, Conn. 06076; Alexander M. Brown, 53 Twin Coach Ct., Daytona Beach, Fla. 32014

[21] Appl. No.: 865,423

[22] Filed: Dec. 29, 1977

[51] Int. Cl.² ............................................. A01K 39/01
[52] U.S. Cl. .................................................. 119/51 R
[58] Field of Search ................... 119/51 R, 52 R, 51.5

[56] References Cited

U.S. PATENT DOCUMENTS

| D231,369 | 4/1974 | Kilham | 119/51 R X |
|---|---|---|---|
| 2,591,126 | 4/1952 | Breck, Jr. | 119/52 R |
| 2,891,508 | 6/1959 | Bower | 119/51 R |
| 3,090,354 | 5/1963 | Merritt et al. | 119/51 R X |
| 3,568,641 | 3/1971 | Kilham | 119/51 R |
| 3,901,192 | 8/1975 | Adams | 119/51 R |

FOREIGN PATENT DOCUMENTS 296944  3/1954  Switzerland ........................... 119/51 R Primary Examiner—Louis G. Mancene
Assistant Examiner—Robert P. Swiatek

[57] ABSTRACT

A wild bird feeder with separate compartments and adjustable dispensing means for seeds of various sizes so that a greater variety of the preferred smaller birds can feed. Novel means are also provided for protecting the seed from rain and from destructive animals and for providing adjustable perches to attract the preferred smaller birds and to permit either hanging or post mounting of the feeder.

11 Claims, 6 Drawing Figures

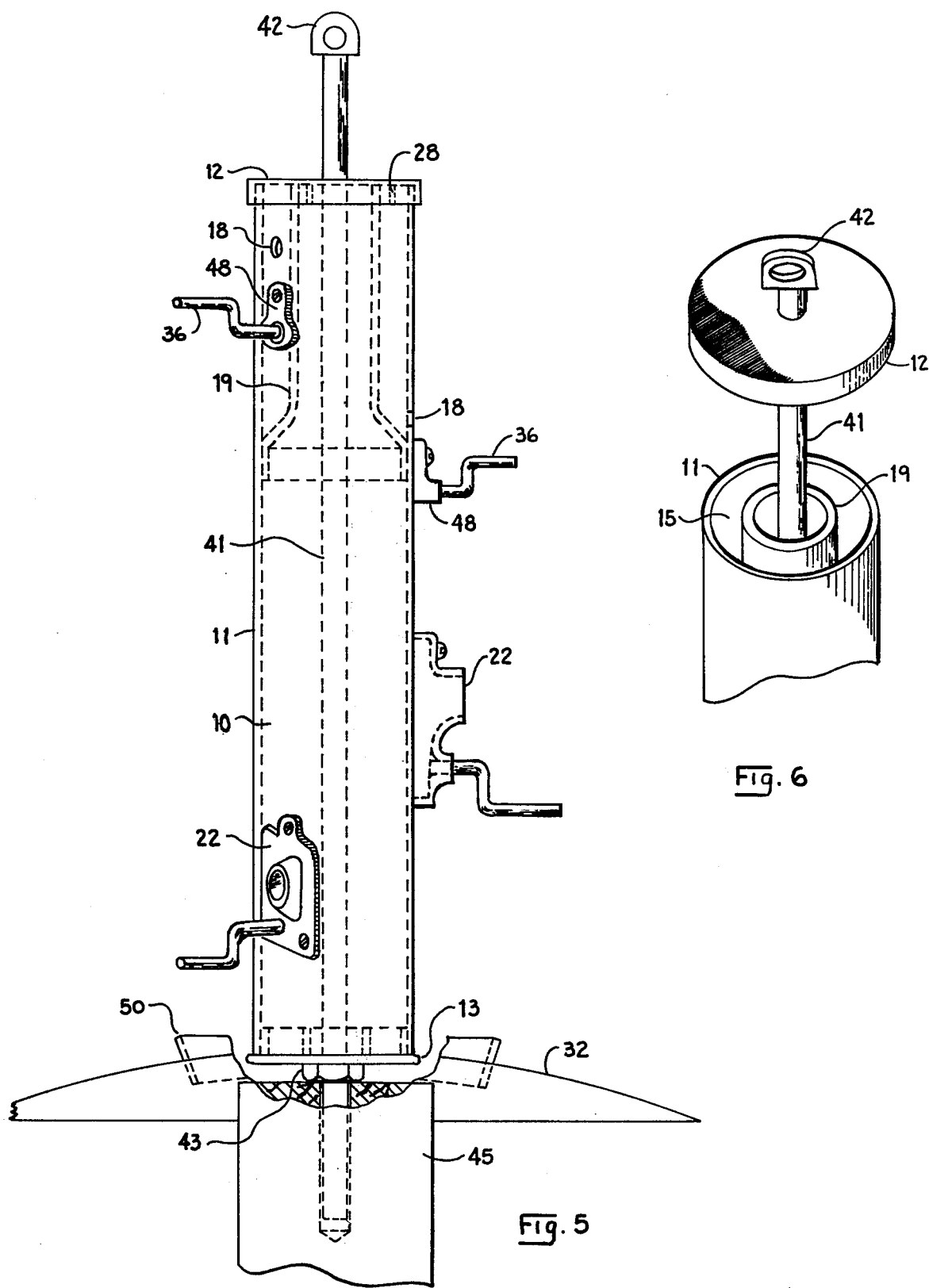

BIRD FEEDERS

BACKGROUND OF THE INVENTION

1. Field of the Invention

This invention is related to wild bird feeders and particularly to those of the hanging or post mounted type comprising vertical tubes which have not, until now, been universal in the type of seed dispensed or in the appeal to the preferred smaller types of birds.

2. Description of the Prior Art

In previous attempts to construct wild bird feeders, many problems were not answered. Separate feeders had to be used for the feeding of different seeds, such as thistle, which is small, and sunflower, which is large. Also, no adequate separation of the perches was found that would prevent the larger birds from keeping the smaller ones away from the feeder. Further, in feeders of the vertical tube type, the seed level soon dropped below the level of many of the hoppers on the tube so that frequent replenishing of the food was necessary to keep the feeder operable. In addition, perches and seed dispensing devices which crossed from one side of the tube to the other, often interfered with the normal gravitational flow of the seed. Destructive animals, such as squirrels, could gain access to the feeder and could then gnaw through the sides of the feeder to destroy it and so gain access to the seed. Furthermore, a universal feeder which could be either hung where desired or post mounted and would, at the same time, satisfactorily protect the food from spoilage by rain or loss and spilling by wind, has not yet been available.

SUMMARY OF THE INVENTION

The present invention comprehends the use of a transparent vertical tube container provided with adjustable metallic dispensing units spaced at chosen intervals around the circumference and along the length of the tube.

One or more dividers, positioned within the tube, separate it into at least two compartments each with its own filling means so that the seeds need never come together in a mixed condition. Of course, if mixed seed is desired, it can be dispensed in any compartment designed for the use of the larger seed.

Each dispensing unit is provided with a seed carrying receptacle outside the perimeter of the tube which is automatically replenished with seed through a port in the tube wall. While such seed is available to the birds at all times, it cannot overflow due to the position of the dispenser seed carrying receptacle in relation to the port in the tube wall. Adjustment means are provided.

Since the dispensing units need not be opposite each other as in the prior art but can be independently positioned where desired on the tube, they can be placed so as to use all the seed in the tube compartment, lengthening the time before refilling as well as giving better separation between the feeding birds.

The bulk of the seed within the tube is protected from the rain entering the dispensing unit by an opening at the bottom of the dispensing unit which effectively channels all moisture to the outside of the tube.

Each dispensing unit is provided with adjustable perch retaining means properly positioned to permit a bird of the desired size access to the dispensing unit. The perch, and/or the perch retaining means, can be straight or eccentric thereby providing lateral and vertical adjustment of perch position to better suit the needs of a particularly desired species. This perch adjustment is also used to further separate the feeding birds and reduce competition and fighting for food.

In one form of the invention, a central vertical shaft is provided which can lock the various parts of the feeder in position and can also be moved vertically within the feeder to provide hanging means at the top or post mounting means at the bottom.

Although the metallic dispensing units prevent squirrels, for example, from chewing their way into the feeder, combination shield - seed catching tray means are provided to prevent animals from gaining any access to the feeder at all. A metal shield, pierced and formed, is fitted below the feeder when it is post mounted to not only prevent entry of any climbing animal but also to serve as a seed catching tray. This same unit can also be used as a squirrel baffle above the feeder when it is in hanging position.

BRIEF DESCRIPTION OF THE DRAWING

Other features and advantages of the invention will be apparent from the following description taken in conjunction with the accompanying drawing wherein:

FIG. 5 is an elevation view of an alternate construction embodying the invention.

FIG. 6 is a perspective view of the top of the feeder of FIG. 5 shown in open position ready for refilling with seed.

DETAILED DESCRIPTION OF THE PREFERRED EMBODIMENT

Figure 1:
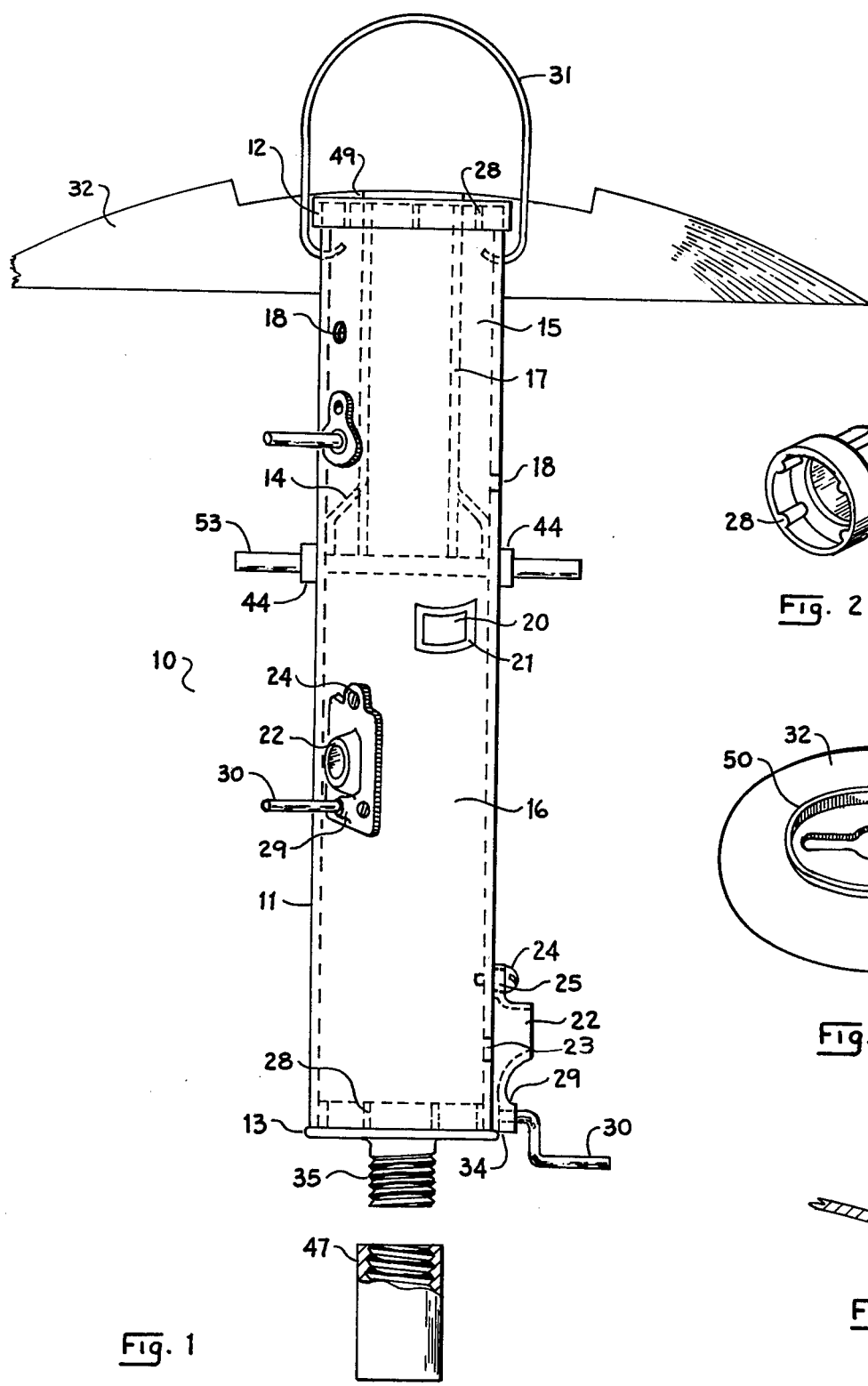
FIG. 1 is an elevation view, partly in section, of a preferred embodiment of the invention in hanging position.

In the exemplary embodiment of the invention as disclosed in the drawing, FIG. 1, a bird feeder, generally designated 10, is shown to comprise a hollow tube container 11 of transparent material, such as plastic, of a preferred diameter and length, and fitted with a metallic top cap 12 and bottom cap 13.

Within the tube 11 is a divider 14 which separates the tube 11 into an upper seed containing compartment 15 and a lower seed containing compartment 16. The upper compartment 15 can be designed to contain a smaller type of seed, such as thistle, with appropriate feeding ports 18, and the lower compartment 16 can dispense a larger seed, such as sunflower; but, obviously, these could be reversed or other spacers or compartments added to suit various seeds and conditions. The ports 18 for the thistle seed are small and need no protection from squirrels who have no appetite for thistle seed.

A smaller diameter hollow tube 17, within tube 11, extends upwardly through spacer 14 and compartment 15 to the top cap 12 providing means for filling the lower compartment 16. Upper compartment 15 can be filled from the top in the outer or primary filler when the top cap 12 is removed, see FIG. 6.

Obviously, as shown in FIG. 5, the divider 14 can be integral with the smaller diameter hollow tube 17 in a reverse funnel construction 19. Either alternate channels the food to the perimeter of tube 11 so that even the last feed left in the compartment will be available to the lower feeding ports 18.

As another alternate filling construction, if the spacer 14 in FIG. 1 had no opening therethrough, and the tube 17 were removed, filling could be through one or more ports 20 below the spacer 14 and in the sidewall of the tube 11. A cap 21 can be provided to seal ports 20 or a pressure sensitive tape, not shown, can be applied to the outside of the tube 11 to seal the opening.

The dispensing units 22 for lower compartment 16, see FIG. 1, are of metal construction and are attached over a port 23 into the tube 11 with one or more screws 24 through elongated slot 25 in the dispensing unit 22 which allows vertical adjustment. The positioned relationship of the dispensing unit 22 to port 23 in the wall of tube 11 determines the flow of the seed from the compartment 16 into the dispensing unit 22 where it is retained outside the wall of the tube 11 and available to the feeding birds. Although only two dispensing units 22 are shown any number can be used and positioned where desired.

Each dispensing unit 22 carries a drain slot 34 at the base which directs any accumulated moisture to the outside of the tube 11 and so prevents water from entering the tube 11 to spoil the bulk of the seed therein contained.

Preferably, two or more dispensing units 22 are located at the bottom of the lower compartment 16 so that practically all the seed can be consumed before refilling. This construction means less frequent filling and has an additional advantage in that the weight of the lower dispensing units 22 lends to stabilize the feeder during strong winds.

Figure 2:
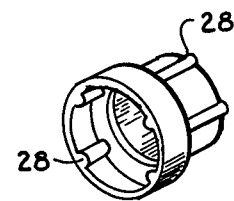
FIG. 2 is a perspective view of a combination top and bottom cap for the feeder.

The caps, both top cap 12 and bottom cap 13, are provided with a plurality of ribs 28 which, on the bottom cap 13 can assist in drainage and on both caps contact the wall of the tube 11 to maintain frictional contact at all times. Since the tube 11 can vary in diameter, the overall diameter of the ribs 28 is so established that the wall of tube 11 can deform from the circular while yet permitting the top cap 12 to be applied over the outer circumference and the bottom cap 13 within the circumferential wall of the tube 11. This permits the use of tubes 11 of widely varying diameters. In some cases, as shown in FIG. 2, it is advantageous to make both caps identical, with the smaller closed end going into the tube 11 and the larger open end going over it. The caps can be frictionally or mechanically, as by screws, bolts or springs, etc., held in position on the ends of tube 11.

Each dispensing unit 22 carries a perch socket 29 which need not extend into the tube 11 much less across it to the opposite side. Because of this novel feature, dispensing units 22 can be placed where needed on the tube 11 and do not have to be positioned directly opposed to each other as known.

The perches 30, see FIG. 1, can be of wood, metal or polymer and can be straight or eccentric as shown in FIG. 1. The eccentric perch 30 can be turned in the socket 29 so that birds of the preferred size can be attracted to that position on the feeder. Obviously, the perch 30 can be straight and the socket 29 can be rotatably eccentric and still accomplish the proper position of the perch 30 within the scope of the invention.

Since the perches 30 do not penetrate the wall of the tube 11, they do not prevent the use of a secondary feeder tube such as 17. Also, there is not structure within the tube 11 to interfere with the normal gravitational flow of the seed.

If it should be advantageous to use a perch penetrating from one side of the tube 11 to the other, for example, to support the spacer 14, see FIG. 1, this perch 53 can be locked in place by split metal sleeves, 44. These sleeves 44 frictionally hold the perch 53 in the desired position. Also, when in position adjacent the wall of tube 11, the metallic sleeves 44 provide protection from gnawing animals. Whether or not such a cross perch 53 is used, the dispensing units 22 can still be placed where desired in accordance with this invention and need not be positioned diametrically opposed.

The mounting post 35 of the bottom cap 13, see FIG. 1, can be threaded as by a one-eighth inch pipe thread and, if of die cast manufacture, can have a center hole to assist in drainage. An extension 47 can be used to aid in post mounting.

Figure 3:
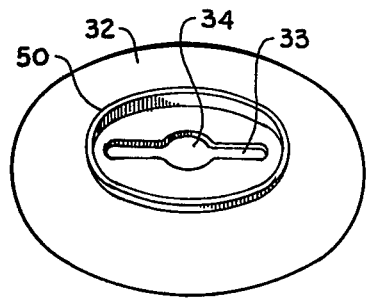
FIG. 3 is a perspective view of a combination animal shield and seed catching tray which can be used with this or other feeders.

Since the metal dispensing units 22 surround the ports 23 into the tube 11, effectively protecting them from gnawing animals, and since these animals cannot gnaw the tube wall unless there is a raw edge from them to start with, the feeder is effectively protected against damage by these animals. The squirrel shield 32, see FIG. 3, which serves to deny the animals any access to the feeder, can be made of plastic but is preferably of metal and of a circular hemispherical shape, of a desired diameter and pierced with a slot 33 adapted to fit loosely over a bale 31 and so be positioned to protect the top of a feeder 10 when it is hanging. The baffle 32 also carries a circular hole 34 adapted to accept the mounting post 35 of bottom cap 13, or any central post, and so protect the feeder from squirrels and similar animals when the feeder is post mounted. The shield 32 can be rigidly or loosely mounted on the feeder.

Figure 4:
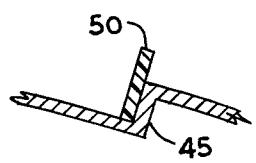
FIG. 4 is a sectional view of a portion of the combination shield and seed catching tray shown in FIG. 3.

The shield 32 is formed with a circular ridge 45, as shown in FIG. 4, which functions as a seed catching tray and converts the shield 32 into a combination shield-seed catching tray and, when the unit is post mounted, eliminates one part from the assembly. Any rain water within the ridge 45 can drain out through the pierced hole 34 or the slot 33. To protect the birds feet from damage in extremely cold conditions, the combination shield-seed catching tray 32 carries a rubber or plastic perch ring 50, see FIG. 4, of a non-conductive material which insulates the birds feet from the cold metal. The perch ring 50 also serves to increase the depth of the seed catching tray to retain seed when in a tilted position.

Referring now to FIG. 5, there is shown an alternate construction embodying the invention but with a central shaft 41, which can be of wood or other material but which is, preferably, a metal rod or wire of a diameter of approximately one-quarter of an inch extending centrally and vertically through the top cap 12, the bottom cap 13, tube 11, and the divider 19 so that the feeder 10, or any part thereof, can move vertically on the central shaft 41.

As shown in FIG. 5, the central shaft 41 carries a ring 42, or other means for hanging the feeder 10 by the upper end. The shaft 41 can also be threaded at the lower end to accomodate nut 43. When hanging, all parts move downwardly to maintain each in its proper location. If desired, the feeder 10 can be locked together by a pin, not shown, through the central shaft 41 above the top cap 12 or, alternately, the parts can be held in place by gravity.

When post mounted, the central shaft 41 can move downwardly through the feeder to provide sufficient length to enter the mounting post 45 or any other mounting means, and maintain the feeder 10 in vertical position. The nut 43 can be advanced accordingly. The top cap 12 can be frictionally held by central shaft 41 in a raised position when filling, as shown in FIG. 6. If desired, inner filling tube 19 can extend above tube 11 to aid in filling the upper compartment 15.

When the combination squirrel shield-seed catching tray 32 is used with this form of invention, the central shaft 41 extends through the hole 34 and nut 43 is positioned to retain it in the desired position.

Since the perches 36 can be located in any position on the tube 11, it is advantageous to provide a perch socket 48, see FIG. 5, not necessarily connected to a dispensing unit 22, which can be attached to the wall of the tube 11 in the proper position to attract the desired species of bird.

A plastic or rubber snubber 49, see FIG. 1, can be used between the shield 32 and the top cap 12, and attached to either, to prevent clatter and noise when the loose shield 32 moves in the wind.

We claim:

1. A bird feeder comprising a hollow cylindrical container with a transparent wall, hanging means above said container and mounting means below, a removable cap at the top of said container, a bottom cap, dispensing units spaced peripherally and vertically around said wall of said container and adapted for the retaining and dispensing of bird food, wherein the improvement comprises:
a divider within the container forming upper and lower feed compartments, said divider preventing food in said upper compartment from mixing with food in said lower compartment, and means including a tube concentrically arranged within said container and passing through said upper compartment and opening into said lower compartment for replenishing the supply of food in said lower compartment.

2. The bird feeder of claim 1 wherein the tube passing through said upper and lower compartments has one end enlarged to form an integral divider between the compartments.

3. The bird feeder of claim 1 wherein the dispensing units retain food outside the wall of said hollow container.

4. The bird feeder of claim 3 wherein the said dispensing units have an opening at the bottom for the drainage of moisture.

5. The bird feeder of claim 3 wherein said dispensing units are supplied with food through a port in the said wall of the said container.

6. The bird feeder of claim 5 wherein said dispensing units surround said ports in said container wall and carry cooperating means with said wall for adjusting the vertical relationship of said dispensing units to said ports.

7. The bird feeder of claim 3 wherein the said dispenser units include a perch retaining means.

8. The bird feeder of claim 7 wherein said dispenser units include perch retaining means adapted to retain a rotatable eccentric perch.

9. The bird feeder of claim 1 wherein the end caps at top and bottom have either internal or external ribs adapted for frictional engagement with the said wall of the said container.

10. The bird feeder of claim 1 comprising perches extending through the walls of said hollow container, said perches are provided with adjustable split metallic rings frictionally disposed about their peripheries for holding them in position.

11. The bird feeder of claim 1 including an animal shield adapted for installation above or below the bird feeder with a depression formed in the said shield and adapted to catch and retain food spilled by the said feeder when the said shield is installed below the said bird feeder.

* * * * *